Figure 1:
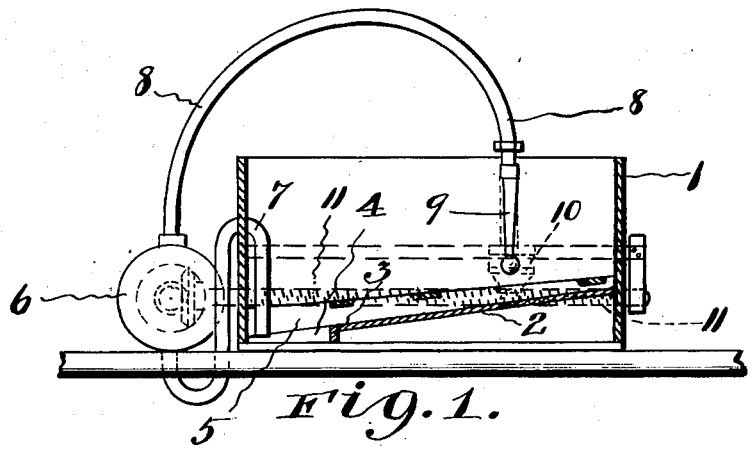

G. E. DUNTON.
METHOD FOR TREATING MOLDS USED IN THE ART OF ELECTROTYPING.
APPLICATION FILED NOV. 14, 1913.

1,111,445.  Patented Sept. 22, 1914.

Witnesses
Lillie M. Perry
W. O. Blackwood

Inventor
George E. Dunton
By Blackwood Bros.
Attorneys

UNITED STATES PATENT OFFICE.

GEORGE E. DUNTON, OF NEW YORK, N. Y.

METHOD FOR TREATING MOLDS USED IN THE ART OF ELECTROTYPING.

1,111,445.  Specification of Letters Patent.  Patented Sept. 22, 1914.

Application filed November 14, 1913. Serial No. 800,962.

*To all whom it may concern:*

Be it known that I, GEORGE E. DUNTON, residing at New York, in the county of New York and State of New York, a citizen of the United States, have invented a certain new and useful Method for Treating Molds Used in the Art of Electrotyping; and I do hereby declare the following to be a full, clear, and exact description of the invention, such as will enable others skilled in the art to which it pertains to make and use the same.

My invention relates to an improved method for treating molds used in the art of electrotyping and more particularly to the wax molds used in forming electrotype plates.

The invention has for its object to provide a method for treating molds, prior to the application of the conductive coating, whereby the grease, oil or oily substance expressed therefrom by the pressing of the form or cut into the mold, in making the impression preparatory to the deposition of the printing shell, is absorbed.

It further has for its object to provide a method for treating molds, prior to the application of the conductive coating, with a substance which will absorb the grease or oil expressed therefrom without in any manner affecting the material or materials of which the mold is composed.

It still further has for its object to provide a method for treating molds, prior to the application of the conductive coating, with a substance which will absorb the grease or oil expressed therefrom, treating the absorbed substance with a dissolving chemical substance and removing the absorved substance and the dissolving chemical substance from the mold by washing or rinsing the same with water or other fluid.

The material of which the molds are formed for the production of printing plates or surfaces in the electrotyping art is generally beeswax, ozocerite wax or like substance which contain an appreciable percentage of grease, oil or oily substance in its composition. In beeswax the grease, oil or oily substance is due to the presence of palmitin and in ozocerite wax, mineral wax, it is due to the presence of petroleum.

In the producing of printing plates or other printing surfaces, to form perfect reproductions of the originals from which the molds are made in the art of electrotyping it is of the utmost importance that the molds be treated to eliminate or free them from all grease, oil or oily substances, prior to the application of the conductive coating, as any treatment for the removal of the grease, oil or oily substances to which the mold may be subjected subsequent to the application of the conductive coating will result in the contamination, deterioration and destruction of the conductive coating.

When making an impression in a wax or other similar mold, preparatory to the deposition of the printing shell, the desired form or cut is pressed or forced into the surface of the mold, which causes any grease, oil or oily substance contained therein to be expressed or forced out and form a thin coating or film on the face of the mold and said coating or film is exceedingly troublesome to the electrotyper, as it causes imperfect and faulty reproductions, especially in the case where the so-called half tone illustrations are being made, which are composed of a collection of very fine, minute dots, or in duplicating of color plates where three or four, or even more, printings are necessary the least variation from the original plate, such as the filling up of the dots or minute indentations made in the wax mold would result in a thickening of the duplicate or reproduction and instead of having a well defined flat printing surface the points would be rounded and lacking in height from one half to one fourth of the original which would utterly ruin the plate.

Figure 2:
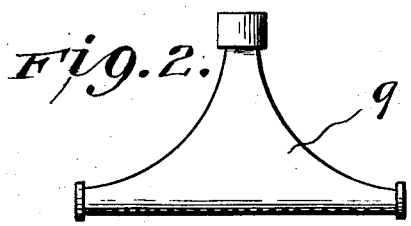
Figure 3:
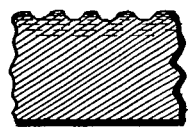
Figure 4:
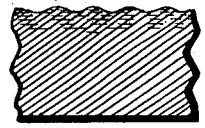
Figure 5:
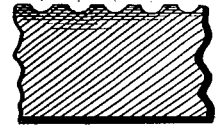
Figure 6:
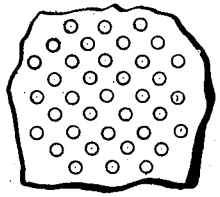
Figure 7:
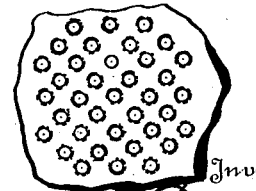

Referring to the drawing which shows one form of apparatus for practising or carrying out my method, Figure 1 is a longitudinal sectional view. Fig. 2 a detail sectional view of the sprinkler. Fig. 3 shows an electrotype half tone in section. Fig. 4 shows a section of an imperfect electrotype taken from the half tone shown in Fig. 1. Fig. 5 shows a section of a perfectly reproduced electrotype. Fig. 6 shows a print from Fig. 5. Fig. 7 shows a print from Fig. 4.

Figs. 3 and 4 show an electrotype and Fig. 7 a print taken therefrom, before being treated by my method, and Figs. 5 and 6 show an electrotype and print therefrom, respectively, after treatment by my method.

In the drawings in which like reference characters denote like parts throughout the several views, 1 represents a tank having an inclined false bottom 2 which terminates at a point 3 short of one end of the tank and forms a well 4.

The false bottom 2 is adapted to receive a removable frame 5 upon which the mold to be treated is designed to be placed and 6 is a pump, of any desired pattern, which is connected by means of a siphon suction pipe 7 to the well 4 and is provided with a flexible discharge pipe or hose 8 which connects with a sprinkler head 9 extending downwardly into the tank, and directly over the mold, and is carried or mounted on a slidable frame 10 which travels on traverse screw 11 operated by any suitable means and said sprinkler head sprays the entire mold.

In practising or carrying out my method of treating molds used in the art of electrotyping I form a mold in the usual manner, by pouring melted molding composition composed largely of ozocerite wax over thin sheets of metal placed on a suitable table and allow the same to become firm, set or hard by the cooling of the wax, then slice a thin layer or shaving from the surface of the wax to provide an even, smooth surface for the mold throughout the impression area.

The form or cut is prepared in the usual manner by being planed down to insure an even surface, then washed with some detergent to remove any printing ink or other substance which may have adhered to the surface of the form or in the indentures therein, all excess fluid absorbed or removed and the form dried by being briskly rubbed with a moderately stiff brush, after which it is brushed over very lightly with a mixture of graphite and lamp black, as is also the surface of the wax, this graphite prevents the form from sticking in the wax, all the surplus material is shaken out of the form and any that remains is carefully removed with a soft brush.

The form thus prepared is placed on a slidable bed of a molding press and the mold placed carefully over the surface with the smooth powdered wax surface resting on the form, both are moved by the slidable bed into the molding press, pressure is applied which presses or forces the form into the wax mold to the predetermined depth desired by the operator of the press, the pressure is released, the slidable bed withdrawn from the press and the mold carefully detached from the form and removed to the builder's bench where it is carefully examined and if it passes inspection it is trimmed down by passing a knife over the surface to remove any portions of wax which may project beyond the surface of the mold as well as the surplus wax around the edges of the impression. Any portions which it is desired to make deeper in the plate are built up in the usual manner. At this stage or point I treat the mold to remove the grease, oil or oily substance therefrom by sprinkling or dusting it over with an absorbing substance, having a marked avidity for grease, working said substance into all the indentures and over the surface of the mold, preferably, with a fine broad surfaced brush. The absorbing substance used is an alkaline earth or carbonate of lime, calcium carbonate or precipitated chalk, having the formula:—$CaCO_3$, but oxid of lime, fullers' earth or alkaline earths could be used. The reason that I employ carbonate of lime is that it has certain affinities and reactions which it is necessary to bring about to successfully remove the grease after its separation from the surface of the wax mold.

The powdered carbonate of lime is allowed to remain on the surface of the wax for a few moments, from three to five minutes, to insure a complete absorption of the grease, then the mold is treated with a pickle composed of sulfuric acid dissolved or mixed with water in the proportions of 12 ounces (fluid) of acid to each gallon of water and when this pickle comes in contact with the carbonate of lime, which has absorbed the grease from the wax, it attacks the lime carbonate, liberating carbon dioxid, and acts upon the grease or oil causing it to congeal or thicken, whereby it floats on the surface of the liquid and may be readily removed by washing or rinsing the mold or by other suitable means. I next wash away the congealed grease, floating on the surface of the liquid on the mold, by subjecting the mold to the action of a stream or jet of water from a pump by means of a nozzle reciprocated back and forth over the surface of the mold and when the grease has been entirely washed away the mold is removed from the pumping trough and the surface dried by a blast of warm air, supplied by any suitable means, when the mold is ready to receive the conductive coating of graphite or other metallic powder after which the mold is again washed out, coated with a preliminary chemically precipitated coating of the desired metal and placed in the electrolytic bath to receive the deposit of metal which constitutes the electrotype shell.

What I claim is:—

1. The method of treating molds used in the art of electrotyping to remove the grease therefrom, consisting in treating the mold, prior to the application of the conductive coating, to a grease absorbing substance, treating said absorbing substance and grease with a substance, whereby the absorbing substance is transformed and the grease liberated and then removing the transformed substance and liberated grease.

2. The method of treating molds used in the art of electrotyping to remove the grease therefrom, consisting in treating the mold prior to the application of the conductive coating, to a grease absorbing substance, treating said absorbing substance with an acid and removing the absorbing substance and acid.

3. The method of treating molds used in the art of electrotyping to remove the grease therefrom, consisting in treating the mold prior to the application of the conductive coating, with carbonate of lime to absorb the grease, converting the grease absorbed carbonate of lime into sulfate of lime, freeing the grease and washing away the free grease held by the carbonate of lime prior to its conversion into sulfate of lime.

4. The method of treating molds used in the art of electrotyping to remove the grease therefrom, consisting in treating the mold with a grease absorbing powder, treating the absorbed substance with a pickle, composed of sulfuric acid mixed with water and then removing the absorbed grease and pickle by washing or rinsing.

5. The method of treating molds used in the art of electrotyping to remove the grease therefrom, consisting in treating the grease, which has been expressed from the mold, with carbonate of lime, and after the grease has been absorbed by the carbonate of lime treating the absorbed grease and the carbonate of lime with an acid and then removing the absorbed grease, absorbing substance and the acid.

In testimony whereof I affix my signature in the presence of two witnesses.

GEORGE E. DUNTON.

Witnesses:
NETTIE F. FAIRCHILD,
HENRY W. BECKER.